United States Patent
de Koos et al.

(10) Patent No.: US 7,234,086 B1
(45) Date of Patent: Jun. 19, 2007

(54) OVERLAPPING JUMPING WINDOW FOR SONET/SDH BIT ERROR RATE MONITORING

(75) Inventors: Andras de Koos, Montreal (CA); Mounir Youssef, Kirkland (CA)

(73) Assignee: PMC Sierra, Inc., Santa Clara, CA (US)

( * ) Notice: Subject to any disclaimer, the term of this patent is extended or adjusted under 35 U.S.C. 154(b) by 542 days.

(21) Appl. No.: 10/755,403

(22) Filed: Jan. 13, 2004

Related U.S. Application Data (60) Provisional application No. 60/440,371, filed on Jan. 16, 2003.

(51) Int. Cl.
*G06F 11/00* (2006.01)

(52) U.S. Cl. .................. 714/704; 714/799; 714/807

(58) Field of Classification Search .................. 398/27; 370/333
See application file for complete search history.

(56) References Cited

U.S. PATENT DOCUMENTS

| | | | |
|---|---|---|---|
| 5,606,563 A | 2/1997 | Dorbolo et al. | |
| 6,310,911 B1 | 10/2001 | Burke et al. | |
| 6,738,395 B1* | 5/2004 | Diaconescu et al. | ........ 370/517 |
| 2006/0159089 A1* | 7/2006 | Diaconescu et al. | ........ 370/389 |

* cited by examiner

*Primary Examiner*—Guy Lamarre
*Assistant Examiner*—Sam Rizk
(74) *Attorney, Agent, or Firm*—Curtis B. Behmann; Borden Ladner Gervais LLP (57) ABSTRACT

A method of performing multiple parallel event accumulations. This method permits devices to implement SONET/SDH Bit Error Rate monitoring on a large number of paths, but at a significantly lower cost of implementation than would be possible using existing approaches. The method removes the need for each path being monitored to have a time reference (frame counter) of its own. Instead, each monitoring path has two accumulators whose active regions will overlap in time such that the total number of frames covered will be a power of 2. This approach allows one global frame counter to be used for all the paths in question, even if those paths have completely different accumulation periods. This method of performing BER tests allows devices to perform such operations on thousands of tributary paths (VT, TU), rather than only on the STS-n/STM-n paths that most current SONET/SDH devices support.

8 Claims, 8 Drawing Sheets

OVERLAPPING JUMPING WINDOW FOR SONET/SDH BIT ERROR RATE MONITORING

RELATED APPLICATIONS

The present application claims the benefit of provisional patent application Ser. No. 60/440,371 filed Jan. 16, 2003.

BACKGROUND OF THE INVENTION

1. Field of the Invention

In the field of communications, SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). This invention relates to SONET/SDH Bit Error Rate Monitoring. More specifically, the present invention relates to reducing the cost of implementation of monitoring multiple channels in parallel.

2. Description of the Prior Art

For many communication systems, the bit error rate (BER) is used as a figure of merit. In SONET/SDH systems, a receiver must be able to determine the incoming BER and react in the event that the BER is above a defined threshold. Though the number of bit errors can never be known exactly, they can be inferred by examining the number of incoming Bit-Interleaved-Parity (BIP) errors seen on an incoming channel.

Figure 1:
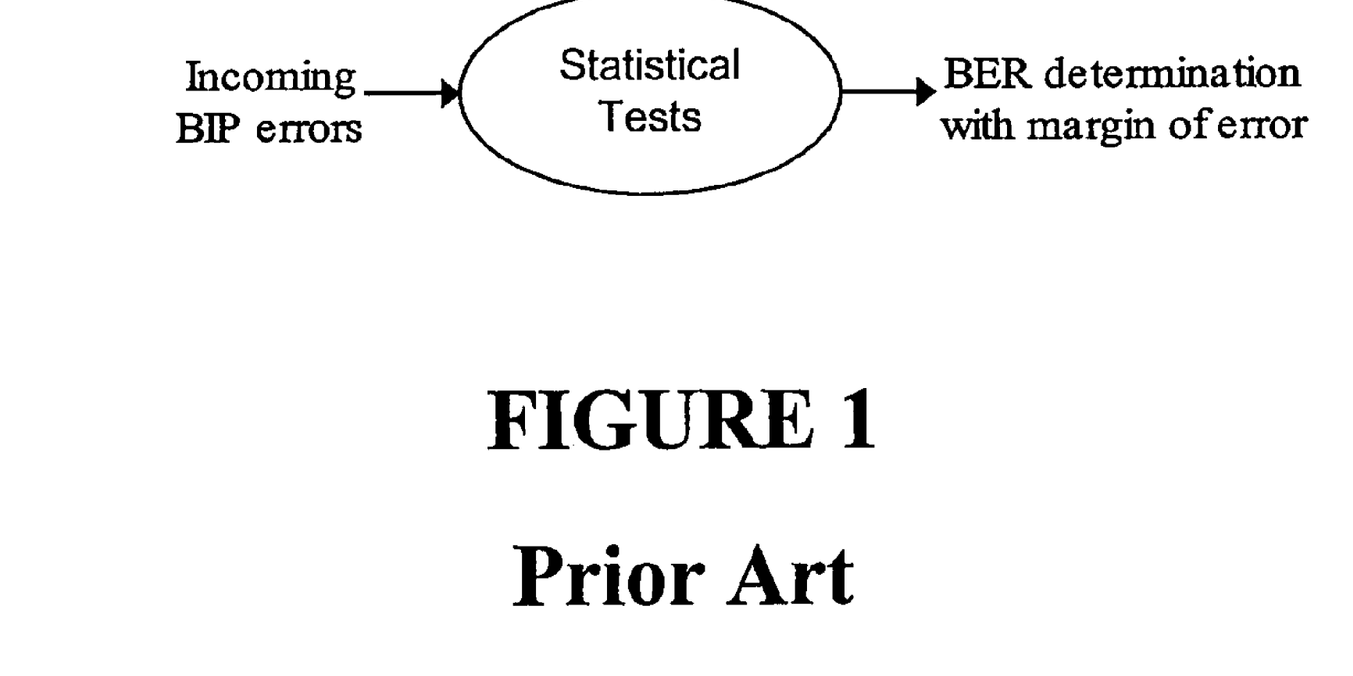
FIG. 1 is a schematic of a known BER testing concept.

FIG. 1 shows a schematic of a generally known BER test concept. From SONET/SDH specifications, we can assume that bit errors assume a Poisson distribution, which has a mean equal to its variance and can be represented by the equation:

$$\mu = \sigma^2 = \lambda$$

It follows that the probability of getting k "hits" over a given period (given that the mean number of hits over such a period is $\lambda$) is represented by the equation:

$$P_k = \frac{\lambda^k}{k!} e^{-\lambda}$$

Not all bit errors will be observed as a BIP error because the BIP checking mechanism is blind to any even number of errors in the same bit position. Therefore, for a given BER rate and time interval, the probability of a BIP error can be estimated as the sum of the Poisson probabilities of observing odd numbers of errors as represented by the equation:

$$P_{BIP} = \sum_{y=1}^{\infty} \frac{\lambda^y}{y!} e^{-\lambda} \text{ where } y \text{ is odd.}$$

We have thus reduced the occurrence of a BIP error at any one BIP position to a Bernoulli trial with probability of "success" $P_{BIP}$. The variance of such a distribution will be $P_{BIP}(1-P_{BIP})$. (i.e., the variance of a Bernoulli trial) We can then determine the expected number of BIP-8 errors per frame, or the number of BIP-2 errors per multiframe by the following equation:

$$\mu_{BIP-8} = 8 \times P_{BIP}, \mu_{BIP-2} = 2 \times P_{BIP}$$

While the variance will be:

$$\sigma_{BIP-8}^2 = 8 \times P_{BIP} \times (1-P_{BIP}), \sigma_{BIP-2}^2 = 2 \times P_{BIP} \times (1-P_{BIP})$$

So for a given BER, we know the expected number of errors per frame/multiframe ($\lambda$) so we can compute the expected number of BIP errors per frame/multiframe ($\mu_{BIP}$), and the variance of the BIP errors ($\sigma_{BIP}^2$). It is by using these parameters that all prior art BER monitors are constructed. By accumulating BIP counts over specific intervals, it is possible to make a determination about the BER.

In order to be SONET/SDH compliant, there are three general criteria that must be followed.

First, the detection/removal of an alarm must be done within a specified maximum declaration/clearing time. This value depends on the level of concatenation, as well as the target and actual BER.

Second, the probability of correct detection/removal (within the maximum detection/clearing time) must be greater or equal to 99%. It should be noted that for ITU, 99% is listed as a requirement; while for Bellcore specifications, 99% is only an objective and 95% is the requirement. In this second criteria, a. For declaration: if the target BER is $10^{-x}$ and the actual BER is $10^{-x}$, then the chance that an alarm is declared within the maximum declaration time should be greater than 99%.

b. For clearing: if the target BER is $10^{-x}$ and the actual BER is $10^{-(x+1)}$, then the chance that the alarm is removed within the maximum clearing time should be greater than 99%.

Third, the probability of false declaration/removal (within the maximum detection/clearing time) must be less than or equal to $10^{-6}$.

a. For declaration: if the target BER is $10^{-x}$, but the actual BER is $10^{-(x+1)}$, then the chance that the monitor will detect a threshold crossing should be less than $10^{-6}$.

b. For clearing: if the target BER is $10^{-x}$ and the actual BER is $10^{-x}$, conversely then the chance that an alarm will be removed should be less than $10^{-6}$.

Figure 2:
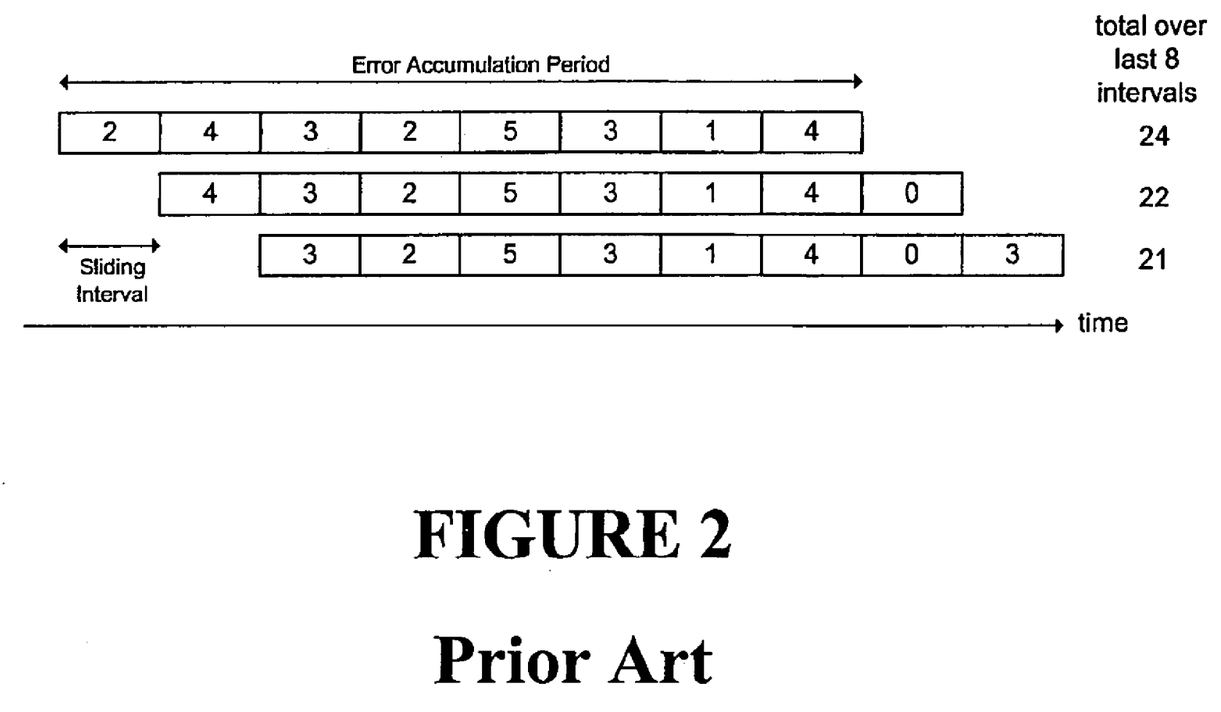
FIG. 2 is a timing diagram of a known sliding window approach to BER testing.

The above three criteria must be combined into a single test. There have been several prior art ways of constructing such a test. Some SONET/SDH specifications suggest a sliding window algorithm whereby the error counts over the last N intervals would be accumulated. As the error count for the newest interval arrives, the oldest error count is discarded. If the sum of BIP errors over an entire window exceeds a predetermined threshold, then an alarm can be declared. A sliding window example is shown in FIG. 2 with N=8 detailing the error counts for each interval, and the total for the last 8 intervals. If the total were to exceed a predetermined threshold, then an alarm could be declared.

While there are situations where a sliding window algorithm is applicable such as to test the BER of a SONET Section or Line (B1 or B2), a sliding window may be not be acceptable where tests need to be done in parallel. Still, while sliding window tests are reliable and have the shortest declaration/clearing time possible, such tests present a problem in the amount of memory needed. For each monitoring path, an entire queue (of N elements) of error counts is needed. Depending on the interval number N and the number of paths to be monitored, it can become very cumbersome to implement this in hardware.

Figure 3:
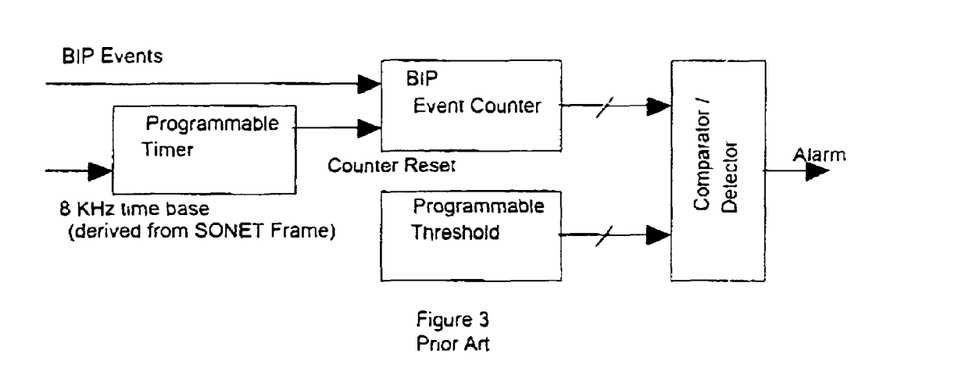
FIG. 3 is a block diagram representing a known jumping window approach to BER testing.
Figure 4:
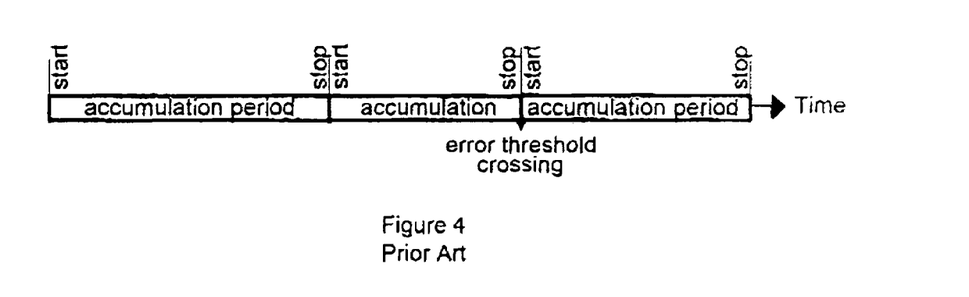
FIG. 4 is a timing diagram of a known jumping window approach to BER testing.

With the drawbacks of sliding window tests in mind, designers have implemented a "jumping window" algorithm as shown by the block diagram of FIG. 3. Using this approach, there is no queue of error counts. Instead, error counts are accumulated over one window (Error Accumulation Period). After one window is complete, the error count is reset, and another accumulation of errors can begin anew. If the error count exceeds a threshold, an alarm can be declared. (Or conversely for clearing: if, at the end of an accumulation period, the number of accumulated errors is less than a pre-determined threshold, an alarm can be removed). FIG. 4 shows a jumping window timing diagram.

While the jumping window approach offer some benefits over the sliding window approach, the jumping window approach suffers from the fact that the time to declare or clear an alarm may be longer than for the sliding window (max declaration time becomes 2*[window length] rather than just the window length for the sliding window). However, it is possible to meet the maximum declaration/clearing time specifications using a jumping window approach, by ensuring the accumulation window size is less than or equal to half the maximum declaration time.

Although the jumping window algorithm can be used successfully, its implementation cost does not scale well for monitoring multiple paths. For most systems, different kinds of paths can be provisioned, e.g., STS-1, STS-3c, STS-12c, etc. The tests for each of the different path types would have different window lengths. Also, the user can set different alarm threshold for each monitoring path. For example, an STS-48 may be configured to carry 1 STS-12c, 8 STS-3c and 12 STS-1. Each kind of path could have a different target BER threshold, which implies that each monitoring path could have a different window length.

Figure 5:
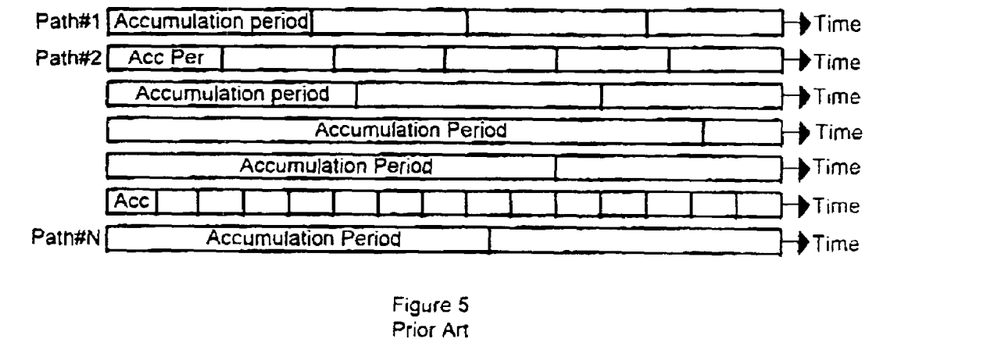
FIG. 5 is a timing diagram of a known jumping window approach to BER testing with multiple paths.
Figure 6:
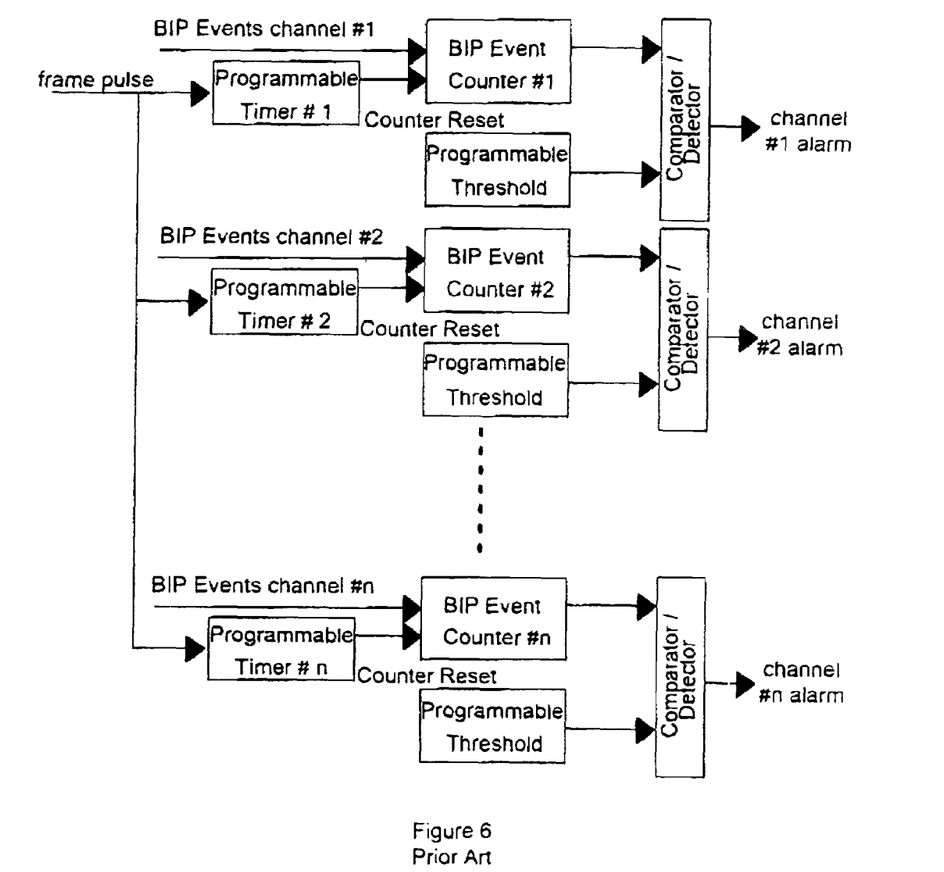
FIG. 6 is a block diagram of a programmable timer for each path monitored in a known BER testing approach.

FIG. 5 shows a jumping window approach with multiple paths. Each path can have a different window length, so there will be no necessary relationship between the start and stop times of error accumulation windows for different paths. As such, the monitor for each path must be able to keep track of time on its own. To use the STS-48 example above, it would require 48 frame counters (one for each possible STS-1 path). This situation is illustrated in the block diagram of FIG. 6, where each path has its own programmable timer (frame counter). If the BER needs to be tested down to very low levels, the size of this frame counter can become extremely large.

It should be understood that SONET/SDH specifications indicate the BER testing need only be done down to the $10^{-9}$ level. However, designers often want to be able to test down to $10^{-12}$ levels in order to test that the intrinsic BER of their system is not too high. As a general rule of thumb, for testing a BER that is 10× lower, the window size will have to be 10× larger. As the window size gets larger, the programmable timers must also increase in capacity in order to accommodate them. The problem is exacerbated if VT/TU levels must be monitored for BER threshold crossings. Due to the sheer number of paths that need to be monitored, what is feasible in hardware for STS-n paths becomes too expensive for VT/TU paths. For example, if all 5376 possible VT1.5 (TU11) channels in an STS-192 (STM-64) are to be monitored, a device needs 5376 frame counters. As industry moves toward higher-density devices, the cost of the jumping window approach becomes problematic. Further, as network processors are often fully occupied with other functions, performing BER monitoring in software may also be problematic for VT/TU levels. Accordingly, it should become apparent that the jumping window is either unsuitable for VT/TU level path monitoring, or that it must be modified for it to be viable in next-generation devices and systems.

What is needed therefore is BER monitoring for SONET/SDH that is capable of monitoring multiple channels in parallel in a cost-effective and efficient manner.

SUMMARY OF THE INVENTION

The present invention provides an Overlapping Jumping Window Approach to BER monitoring and allows a single time reference to be used for an unlimited number of monitoring channels. The Overlapping Jumping Window approach to BER Monitoring according to the present invention allows the user to program the setting for each channel—i.e., each channel can be independently set to monitor for any allowable BER. The present invention provides a reduction in overall cost that is achieved is by adding a second BIP error accumulator to each monitoring path. Though it may seem counterintuitive that adding a second accumulator can lead to an overall reduction in the cost of implementation, the way the accumulators are overlapped in time actually simplifies the overall operation.

Significant savings can be obtained using such an approach. If a frame counter of 36 bits were to be provisioned, then the savings from this approach for the 5376 possible VT/TU paths in an STS-192/STM-64 will be hundreds of thousands of bits. The Overlapping Jumping Window according to the present invention may be embodied as a software algorithm running on a dedicated processor, or as a hardware specific circuit.

In accordance with a first aspect of the present invention, there is provided a method of determining an error level of a data channel, said method comprising: receiving channel parity error data in the form of channel error events data that indicates bit error occurrences within a set of data carried on a channel data channel; integrating said channel error events data on overlapping accumulation periods to form integrated channel error events data such that the total time in frames covered by two overlapping periods is a power of 2; comparing said integrated channel error events data with a declaration threshold and a clearing threshold; indicating an alarm when said integrated channel error events data exceeds said declaration threshold; and removing an alarm when, upon finishing an accumulation period, said integrated channel error events data does not exceed said clearing threshold.

In accordance with a second aspect of the present invention, there is provided a mechanism for determining an error level of a data channel, said mechanism comprising: a path memory for storing all path information including bit error rate (BER) monitoring threshold and alarm status; a lookup table memory for programmably setting accumulation period and error threshold for each BER test; a bit interleaved parity (BIP) error count memory for holding two BIP error accumulators for each path; a path scheduler for selecting which path is currently being processed, and providing related addresses to said path memory and said BIP error count memory; a global frame counter for counting frames by using an incoming frame reference; and a monitor logic for performing comparison between accumulated errors and error threshold, and declaring alarms as appropriate.

In accordance with a second aspect of the present invention, there is provided a method of determining an error level of a data channel, said method comprising: reading path information based upon a path schedule block; determining path type, target bit error rate, and whether to retrieve settings for alarm declaration or for alarm clearing; based upon information of said determining step, obtaining appropriate settings for bit interleaved parity (BIP) threshold and integration period from a setting memory; based upon said integration period and global frame count, determining whether a first accumulator is active, a second accumulator is active, or whether both are active; retrieving BIP count memory for the appropriate path and accumulator depending on accumulator activity; adding an incoming error count to accumulations as appropriate; asserting or removing alarms as appropriate; clearing error counts as appropriate; writing a new error count to the BIP count memory; and writing any change in alarm status to path memory.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention provides a method of BER monitoring by way of an Overlapping Jumping Window. The prior art jumping window approach as described above involves, for each monitoring path, the end of one accumulation period followed immediately by the start of the next. In contrast, the overlapping jumping window algorithm in accordance with the present invention provides an advantageous difference in the form of one global counter for all monitoring paths: an N-bit wrap-around counter. Imagine that for a specific path, the integration period (error accumulation period) is a power of two ($2^k$ frames). Of course, this is a rare case, but the general form of the present invention will be discussed further below. The integration periods can be matched to the global counter (use as an example N=8 and k=5). An example of start/stop points when the integration period=$2^k$ is shown in TABLE 1.

TABLE 1

| Integration period | From global counter range | To global counter range |
|---|---|---|
| 1 | 00000000 | 00011111 |
| 2 | 00100000 | 00111111 |
| 3 | 01000000 | 01011111 |
| 4 | 01100000 | 01111111 |
| ... | ... | ... |
| 8 | 11100000 | 11111111 |
| GENERALLY: | XXX00000 | XXX11111 |

Figure 7:
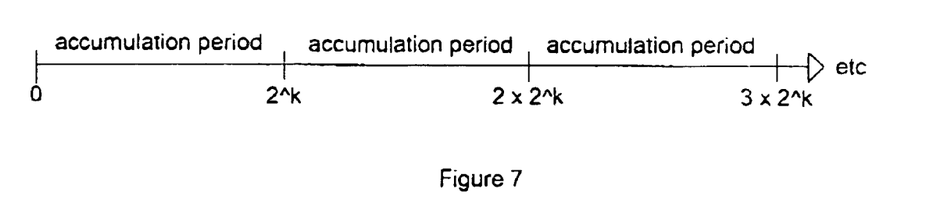
FIG. 7 shows a series of frames with an integration period of $2^k$ frames in accordance with the present invention.

Even more generally, integration periods would start when the k least significant bits of the global counter are all zeros and would finish when the k least significant bits are all ones (equal to $2^k-1$). FIG. 7 illustrates a Jumping Window with an integration period=$2^k$ frames.

Of course, this is not entirely applicable to the general case because we want to be able to provision any sized integration period, not only those that are powers of 2. Suppose now that we have an integration period (IP) that is not a power of two, and that takes k bits to express in binary: IP[k-1:0]. Suppose further that we apply the same rule as above, namely that the integration period will begin when the last k bits are 0, and ends when the last k bits of the global counter are equal to (IP-1). For example, TABLE 2 shows the start and stop times for several consecutive integration periods when IP=1101.

TABLE 2

| Integration period # | From global counter range | To global counter range |
|---|---|---|
| 1 | 00000000 | 00001100 |
| 2 | 00010000 | 00011100 |
| 3 | 00100000 | 00101100 |
| ... | 00110000 | 00111100 |
| GENERALLY: | XXXX0000 | XXXX1100 |

Figure 8:
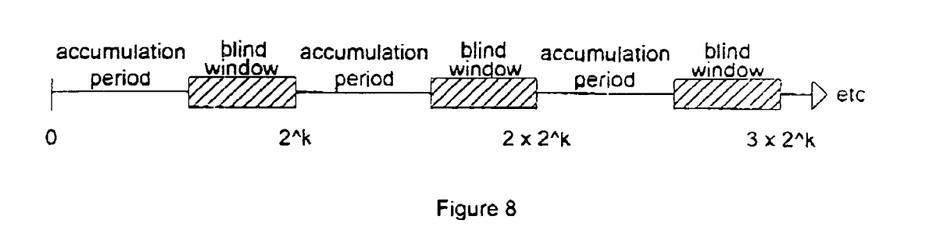
FIG. 8 shows a series of frames with an arbitrary accumulation period in $2^k$ frames including a blind window between integration periods in accordance with the present invention.

FIG. 8 shows an arbitrary accumulation period in $2^k$ frames. Here, there is a "blind window" between integration periods where errors would not be accumulated. Clearly, this is not an ideal solution because there is an interval within each $2^k$ frames where BIP errors would be missed. However, this has successfully divorced the frame counter from the path BER monitor, as all monitoring paths can follow the general rule in TABLE 2 by comparing the global frame counter value with the integration period specific to that path.

With continued reference to FIG. 8, the last step is to cover the "blind window". One solution to this problem would be to extend the integration period to a power of 2, (and scaling the error threshold to match). While this solution may apply to some applications, it is not suited for SONET/SDH BER monitoring because in extending the integration period we may violate the maximum declaration time specification, or otherwise breach the required confidence levels. Also, the goal is to give the user the flexibility to program any desired integration period, not just those that are a power of 2. The best way to solve the "blind window"

problem is to superimpose a second integration period, but one that finishes at $2^k-1$, and starts at $2^k$-IP. The start and stop points are the bit-wise inversions of the start and stop points of the first integration period. Below is an example with IP=10110101b, and the situation is illustrated more generally in FIG. 9.

| | | |
|---|---|---|
| Accumulator 1 start: | 00000000 | |
| Accumulator 1 end: | 10110100 | |
| Accumulator 2 start: | 01001011 | (bit-wise inversion of accumulator 1 end) |
| Accumulator 2 end: | 11111111 | (bit-wise inversion of accumulator 1 start) |

Figure 9:
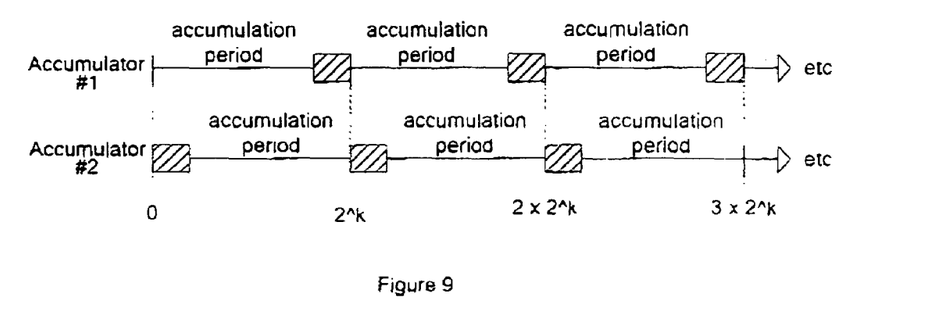
FIG. 9 shows two overlapping gapped accumulation period in $2^k$ frames in accordance with the present invention.

In FIG. 9, there is shown a schematic of two overlapping gapped accumulation periods in $2^k$ frames. Such a scheme involves no missed errors and does not need a per-path frame (multiframe) counter. However, such a scheme now needs a second accumulator, but as can be shown, far fewer bits are needed for BIP error accumulation than are needed for frame counting for a SONET/SDH compliant Poisson BER monitor.

It should be noted how different BER tests can use the same global frame counter (GFC), even if their integration periods do not require the same number of bits. Logic would be needed to determine how many bits are needed for each test. If, for example, test 1 needs k bits and test 2 needs j bits, both tests can use the same global frame counter as long as both j and k are smaller than the width of the GFC. Consider the example with IP_1=1101, and IP_2=1001011. In this case, integration period #1 needs 4 bits, and integration period #2 needs 7 bits as seen by TABLE 3 which details an example of two BER tests with different integration periods.

TABLE 3

| | Accumulator | Start | End |
|---|---|---|---|
| IP_1 | Accumulator 1 | 0000 | 1100 |
| (k = 4 bits) | Accumulator 2 | 0011 | 1111 |
| IP_2 | Accumulator 1 | 0000000 | 1001010 |
| (j = 7 bits) | Accumulator 2 | 0110101 | 0000000 |

Or expressed more generally, TABLE 4 details two BER monitoring tests with different integration periods.

TABLE 4

| | Accumulator | Start point | Endpoint |
|---|---|---|---|
| IP_1 | Accumulator 1 | GFC mod $2^k$ = k zeros | GFC mod $2^k$ = (IP 1 − 1) |
| (k bits) | Accumulator 2 | GCF mod $2^k$ = XOR (IP 1 − 1) | GCF mod $2^k$ = k ones |
| IP_2 | Accumulator 1 | GFC mod $2^j$ = j zeros | GFC mod $2^j$ = (IP 2 − 1) |
| (j bits) | Accumulator 2 | GCF mod $2^j$ = XOR (IP 2 − 1) | GCF mod $2^j$ = j ones |

Figure 10:
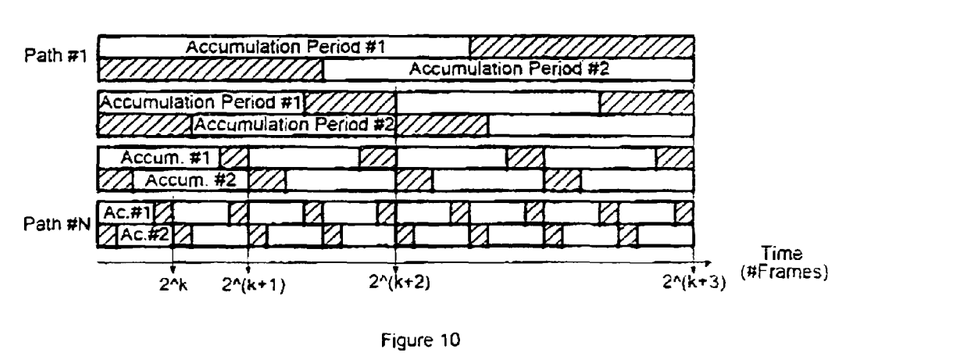
FIG. 10 shows BER monitoring with different integration periods in accordance with the present invention.

As shown in FIG. 10, it should be noted that the size of the integration period in relation to $2^k$ can vary from 1:2 (for example when IP=1000) to almost 1:1 (for example when IP=1111). However, the above scheme guarantees that whatever the size of the "blind window", with two accumulators no errors will ever be missed. The two accumulators operate independently of one another and either one of the accumulators for each path can declare or remove alarms. The two accumulators must operate independently because a Poisson distribution of bit errors is assumed. If the two did not operate independently, the superimposition of the two accumulators would not present a complete picture of the BER of the incoming channel. As such, when a BIP error is detected, it would be added to one accumulation or to both, depending on which of the two are currently active.

There is some minimal interaction between the two accumulators upon alarm declaration and alarm clearing. It would not be acceptable for one accumulator to test for declaration, and at the same time the other accumulator for removal. As such, when one accumulator clears an alarm, the other accumulator is reset; while when one accumulator sets an alarm, the other accumulator is set to its maximum level. This eliminates the possibility of invalid states and ensures that one accumulator will not clear (declare) an alarm that has just been declared (cleared).

Using the Overlapping Jumping Window of the present invention, there is no longer a need to have a frame counter on each path. However, each path does need to provision a second BIP event counter. In the case where the cost of a second BIP event counter is smaller than the cost of a frame counter, then tremendous savings can be achieved. This situation is always apparent in the case of SONET/SDH BER monitoring when assuming a Poisson distribution of errors. The maximum time to declare an alarm is the same as it would be for the Jumping Window—i.e. twice the integration period.

While the Overlapping Jumping Window of the present invention is discussed in terms of the specific application of SONET/SDH BER monitoring, it should be readily understood that there are other situations where the concepts described herein can either be used directly or adapted without straying from the intended scope of the present invention. While the main principles involve multiple accumulation intervals being fixed in time with respect to one another, such a concept may be usable for different kinds of performance monitoring. For situations where the maximum declaration time is either less strict, or undefined all together, the second accumulation period may be dropped in favour of a single gapped jumping window. Such a scheme would not be applicable to SONET/SDH because of the maximum declaration time requirements, but could be applied to other areas. While the maximum declaration time would therefore now depend not on the integration period, but on the IP/$2^k$ ratio, this may or may not be an issue for other applications.

Figure 11:
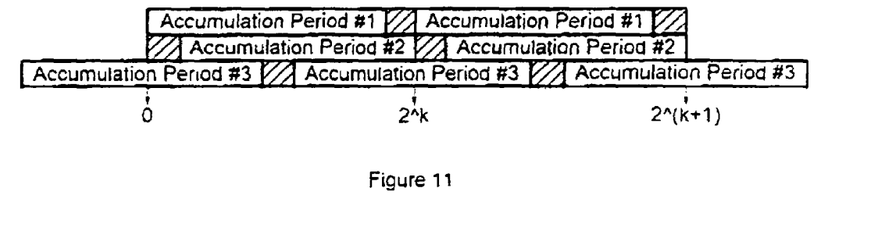
FIG. 11 shows two overlapping gapped accumulation period in $2^k$ frames with a third window straddling the $2^k$ frame boundary in accordance with another embodiment of the present invention.

The Overlapping Jumping Window according to the present invention could also be modified to improve the maximum declaration/clearing time by adding a third accumulation window, as illustrated in FIG. 11. In such instance, the third window would straddle the $2^k$ frame boundary. The maximum declaration time is improved, and will be less than two integration periods (in FIG. 11, the maximum declaration time becomes 1.5 times the accumulation period). But again, the maximum declaration time can be dependent upon the ratio of IP/$2^k$ value, and not directly upon the integration period itself.

Figure 12:
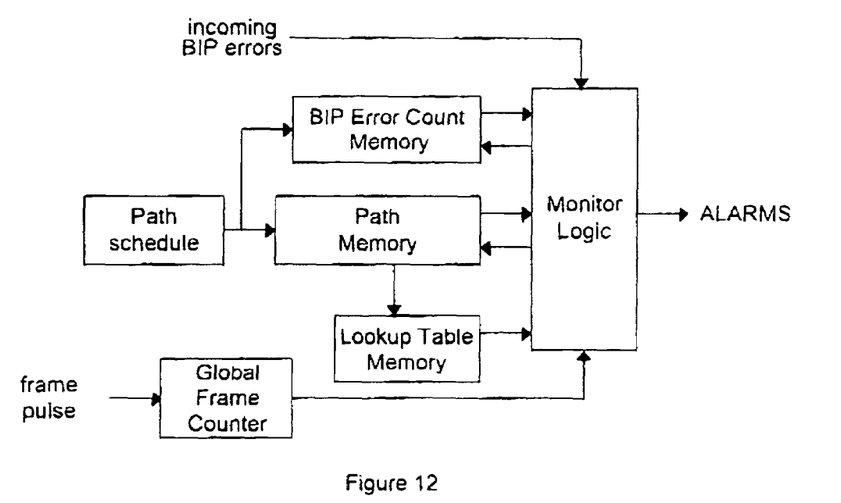
FIG. 12 shows a block diagram representing the overlapping jumping window BER monitor in accordance with the present invention.

FIG. 12 shows a block diagram of a preferred embodiment of an Overlapping Jumping Window BER Monitor according to the present invention. While this flow can be used in hardware or software, its greatest advantage is when implemented in hardware such as an ASIC or FPGA. A notable feature of the diagram below is that there is only one Global Frame counter that is used for all paths. The same combinatorial logic can be used for all the paths. Three memories would be needed:

a. Path Memory, which would store all the path info such as the BER monitoring threshold and the alarm status.

b. The Lookup Table Memory, where the user can program the settings (accumulation period and error threshold) for each BER test.

c. The BIP Error Count Memory, which would hold each path's two BIP error accumulators.

Other blocks include:

a. The Path Scheduler: select which path is currently being processed, and provides the addresses to the path memory and BIP error count memory.

b. The Global Frame Counter counts the frames (or multiframes) by using an incoming frame reference. This running frame count is used to determine which accumulator is currently active.

c. The monitor Logic performs all the necessary comparison between the accumulated errors and the error threshold, and declares alarms as appropriate.

The use of a Lookup Table assumes that the number of tests to be performed ((number of path types)×(number of target BER)×(2 for declaration and clear tests)) is less than the number of monitoring tests that need to be done in parallel. If this were not the case, then it would be more advantageous to write the settings to the path directly.

The basic flow is as follows and works regardless of the number of paths that need to be considered:

a. Path information is read based upon the path schedule block. From this, the logic can determine the path type, the target BER and whether to retrieve the settings for alarm declaration or for alarm clearing.

b. Using the information in a) the logic will read the appropriate settings (BIP threshold and integration period) contained in the Lookup Table memory.

c. Using the integration period setting and the global frame count, logic can determine whether accumulator #1 is active, accumulator #2 is active, or whether both are active.

d. Depending upon which accumulator(s) is (are) active, the logic can then retrieve the BIP count memory for the appropriate path and accumulator.

e. The logic can then add the incoming error count to the accumulation(s) as appropriate, asserts or removes alarms as appropriate, and clears error counts as appropriate.

f. The new error counts are written to the BIP count memory, and any change in alarm status is written to the path memory.

In operation, the Overlapping Jumping Window of the present invention offers significant advantages over its predecessors in terms of cost of implementation while having the same performance as the Jumping Window in terms of being able to meet confidence requirements and maximum declaration/clearing times. To illustrate the amount of savings that can be obtained using this approach, consider the 5376 VT/TU paths that could be monitored in an STS-192/STM-64 stream. Consider further, that most systems require two monitors per path—i.e., two bit error rates have to be tested for simultaneously (commonly known as Signal Degrade (SD) and Signal Fail (SF)). If the user wants to monitor for BER as low as $10^{-12}$, then a frame counter of at least 36 bits would be needed. Conversely, the BIP error counter needs only 5 bits for VT/TU channels.

Using the Jumping Window, each path needs 2 frame counters and two BIP error accumulators, which will add up to 82 bits. Over all 5376 paths, this comes to over 440 thousand bits. For the Overlapping Jumping Window, however, each VT/TU path would have 4 accumulators (two for each monitor on that path) for 20 bits. Over the 5376 paths, this comes to only 108 thousand memory bits. For frame counting and error accumulation, we are saving over 300 thousand bits, or more than 75% by adopting the Overlapping Jumping Window approach. Whatever extra logic is needed for the Overlapping Jumping Window (such as for the Global Frame Counter) is more than offset by the savings in memory bits. In the general case, the savings will be greatest when there is a large number of paths need to be monitored in parallel, when the needed integration periods are long, and when the accumulations themselves have a low ceiling.

For highly integrated devices, the savings achieved here can go towards decreasing die size and increasing yield, and consequently decreasing the cost to produce the device. Also, the reduction in cost of one function may allow other functions to be included on a silicon device that would not have fit on the die using previous approaches to BER monitoring. If the approach is implemented in software instead of within a device, the savings may mean that a dedicated processor does not have as much work to do as it would have if the Jumping Window or sliding window been used in its place. This can reduce overall costs as well.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method of determining an error level of a data channel, said method comprising:

receiving channel parity error data in the form of channel error events data that indicates bit error occurrences within a set of data carried on a channel data channel;

integrating said channel error events data on overlapping accumulation periods to form integrated channel error events data such that the total time in frames covered by two overlapping periods is a power of 2;

comparing said integrated channel error events data with a declaration threshold and a clearing threshold;

indicating an alarm when said integrated channel error events data exceeds said declaration threshold; and removing an alarm when, upon finishing an accumulation period, said integrated channel error events data does not exceed said clearing threshold.

2. The method as claimed in claim 1 where all channels being monitored share a global frame counter without regard to programmed integration period length of any channel.

3. The method as claimed in claim 1 where each accumulation period, declaration threshold, and clearing threshold are programmable.

4. The method as claimed in claim 1 further including recovering line or framing pulses from each data channel, and deriving a clock time base from said pulses for the step of integrating said channel error events data.

5. A mechanism for determining an error level of a data channel, said mechanism comprising:

a path memory for storing all path information including bit error rate target (BER) monitoring threshold and alarm status;

a lookup table memory for programmably setting accumulation period and error threshold for each BER test;

a bit interleaved parity (BIP) error count memory for holding two BIP error accumulators for each path;

a path scheduler for selecting which path is currently being processed, and providing related addresses to said path memory and said BIP error count memory;

a global frame counter for counting frames by using an incoming frame reference; and a monitor logic for performing comparison between accumulated errors and error threshold, and declaring and clearing alarms as appropriate.

6. The mechanism as claimed in claim 5 wherein said mechanism is embodied in hardware.

7. The mechanism as claimed in claim 5 wherein said mechanism is embodied in executable program instructions stored on a computer readable medium.

8. A method of determining an error level of a data channel, said method comprising:

reading path information based upon a path schedule block;

determining path type, target bit error rate, and whether to retrieve settings for alarm declaration or for alarm clearing;

based upon information of said determining step, obtaining appropriate settings for bit interleaved parity (BIP) threshold and integration period from a setting memory;

based upon said integration period and global frame count, determining whether a first accumulator is active, a second accumulator is active, or whether both are active;

retrieving BIP count memory for the appropriate path and accumulator depending on accumulator activity;

adding an incoming error count to accumulations as appropriate;

asserting or removing alarms as appropriate;

clearing error counts as appropriate;

writing a new error count to the BIP count memory; and writing any change in alarm status to path memory.

* * * * *